US012776843B2

(12) United States Patent
Vista et al.

(10) Patent No.: US 12,776,843 B2

(45) Date of Patent: Oct. 27, 2026

(54) BACKBONE NETWORKS FOR HYBRID QUANTUM DATA TRANSMISSION

(71) Applicant: Cisco Technology, Inc., San Jose, CA (US)

(72) Inventors: Francesco Vista, Barletta (IT); Dan C. Holme, Worthing (GB); Stephen DiAdamo, Munich (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 368 days.

(21) Appl. No.: 18/624,368

(22) Filed: Apr. 2, 2024

(65) Prior Publication Data

US 2025/0309998 A1 Oct. 2, 2025

(51) Int. Cl.

| | |
|---|---|
| ***H04B 10/70*** | (2013.01) |
| ***H04B 10/118*** | (2013.01) |
| ***H04L 49/60*** | (2022.01) |
| ***H04Q 11/00*** | (2006.01) |

(52) U.S. Cl.

CPC ........... *H04B 10/70* (2013.01); *H04B 10/118* (2013.01); *H04L 49/604* (2013.01); *H04Q 11/0071* (2013.01)

(58) Field of Classification Search

CPC ..... H04B 10/70; H04B 10/118; H04L 49/604; H04Q 11/0071

See application file for complete search history.

(56) References Cited

U.S. PATENT DOCUMENTS

| | | | | |
|---|---|---|---|---|
| 2017/0230174 | A1* | 8/2017 | Choi | H04L 9/12 |
| 2021/0105135 | A1 | 4/2021 | Figueroa et al. | |
| 2022/0303023 | A1 | 9/2022 | Innes | |
| 2022/0303129 | A1 | 9/2022 | Rahman et al. | |
| 2022/0309375 | A1 | 9/2022 | Vacon et al. | |
| 2023/0163860 | A1* | 5/2023 | Van Den Bossche | H04B 10/118 398/140 |
| 2023/0188548 | A1 | 6/2023 | Bhaskar et al. | |
| 2023/0370169 | A1 | 11/2023 | Chiesa et al. | |
| 2023/0385683 | A1* | 11/2023 | Yoo | G06N 10/20 |
| 2024/0031224 | A1 | 1/2024 | Stockert et al. | |
| 2024/0070514 | A1* | 2/2024 | Samuel | G06N 10/80 |

FOREIGN PATENT DOCUMENTS

WO 2022094268 A1 5/2022

OTHER PUBLICATIONS

Bayerbach M.J., et al., "Bell-state Measurement Exceeding 50% Success Probability with Linear Optics", Science Advances, Research Article, vol. 9, No. 32, Aug. 9, 2023, pp. 1-9.

Boone K., et al., "Entanglement over Global Distances via Quantum Repeaters with Satellite Links", Physical Review A, vol. 91, May 26, 2015, pp. 1-5.

(Continued)

*Primary Examiner* — Pranesh K Barua

(74) *Attorney, Agent, or Firm* — Edell, Shapiro & Finnan, LLC

(57) ABSTRACT

An embodiment uses entanglement and quantum teleportation to build a quantum backbone network. A network interface interconnects packetized quantum networks with entanglement-based quantum backbone networks.

20 Claims, 7 Drawing Sheets

(56) References Cited

OTHER PUBLICATIONS

Chiti F., et al., "Quantum Satellite Backbone Networks Design and Performance Evaluation", ICC 2021—IEEE International Conference on Communications, Jun. 14-23, 2021, 6 Pages.
Coutinho B.C., et al., "Robustness of Noisy Quantum Networks", Communications Physics, vol. 5, No. 105, Apr. 28, 2022, retrieved from https://doi.org/10.1038/s42005-022-00866-7, pp. 1-9.
Dahlberg A., et al., "A Link Layer Protocol for Quantum Networks", arXiv: 1903.09778v1 [quant-ph], Mar. 23, 2019, pp. 1-56.
Diadamo S., et al., "Packet Switching in Quantum Networks: A Path to Quantum Internet", American Physical Society, Physical Review Research, Oct. 28, 2022, pp. 1-17.
Diadamo S., et al., "The Impact of Quantum Memory Quality on Entanglement Assisted Communication", arXiv:2307.15911v1 [quant-ph], Jul. 29, 2023, 10 Pages.
Gundogan M., et al., "Proposal for Space-borne Quantum Memories for Global Quantum Networking", npj, Quantum Information, vol. 7, No. 128, Aug. 18, 2021, retrieved from https://doi.org/10.1038/s41534-021-00460-9, pp. 1-10.
Lauk N., et al., "Perspectives on Quantum Transduction", Quantum Science and Technology, vol. 5, No. 2, Mar. 17, 2020, retrieved from https://iopscience.iop.org/article/10.1088/2058-9565/ab788a, pp. 1-15.
Lee Y., et al., "A Quantum Router Architecture for High-fidelity Entanglement flows in Quantum Networks", npj, Quantum Information, vol. 8, Article No. 75, Jun. 29, 2022, retrieved from https://www.nature.com/articles/s41534-022-00582-8, pp. 1-8.
Lu C-Y., et al., "Micius Quantum Experiments in Space", arXiv:2208.10236v1 [quant-ph], Aug. 22, 2022, pp. 1-53.
Mandil R., et al., "Quantum Key Distribution in a Packet-switched Network", npj, Quantum Information, vol. 9, No. 85, Sep. 9, 2023, retrieved from https://doi.org/10.1038/s41534-023-00757-x, pp. 1-10.
Martinez L.I., et al., "Towards Fast Quantum Key Distribution with Quantum Frames", Quantum Physics, Sep. 25, 2008, 2 Pages.
Munro W.J., et al., "Designing Tomorrow's Quantum Internet", AVS Quantum Science, vol. 4, No. 2, Jun. 8, 2022, pp. 1-8 retrieved from https://doi.org/10.1116/5.0092069.
Muralidharan S., et al., "Optimal Architectures for Long Distance Quantum Communication", Scientific Reports, vol. 6, Article No. 20463, Feb. 15, 2016, pp. 1-10.
On M.B., et al., "Demonstration of Quantum Channel Monitoring via Quantum Wrappers", Optical Fiber Communication Conference and Exhibition (OFC), Mar. 5-9, 2023, 3 Pages.
Parny L.F., et al., "Satellite-based Quantum Information Networks: Use Cases, Architecture, and Roadmap", Communications Physics, vol. 6, No. 12, Jan. 16, 2023, retrieved from https://doi.org/10.1038/s42005-022-01123-7, pp. 1-17.
Semenenko V., et al., "Entanglement Generation in a Quantum Network with Finite Quantum Memory Lifetime", AVS Quantum Science, vol. 4, No. 1, Mar. 8, 2022, retrieved from https://doi.org/10.1116/5.0082239, pp. 1-8.
Shi S., et al., "Concurrent Entanglement Routing for Quantum Networks: Model and Designs", SIGCOMM'20, Aug. 10-14, 2020, Virtual Event, retrieved from https://doi.org/10.1145/3387514.3405853, pp. 62-75.
Yehia R., et al., "Connecting Quantum Cities: Simulation of a Satellite-Based Quantum Network", arXiv:2307.11606v1 [quant-ph], Jul. 21, 2023, pp. 1-24.
Yoo S.J.B., et al., "Quantum Wrapper Networking", arXiv:2305.00591v1 [quant-ph], Apr. 30, 2023, pp. 1-7.
Zhang H., et al., "Hybrid Packet Switching Assisted by Classical Frame for Entanglement-based Quantum Networks", arXiv:2310.02770v1 [quant-ph], Oct. 4, 2023, pp. 1-9.

* cited by examiner

BACKBONE NETWORKS FOR HYBRID QUANTUM DATA TRANSMISSION

TECHNICAL FIELD

The present disclosure relates to communication systems.

BACKGROUND

The advent and integration of a global quantum network could potentially pave the way for advancements in secure communication and computing capabilities. At the core of this quantum revolution lies the distribution of entanglement, a quantum phenomenon inherently linked to quantum information and secure communication. An entanglement-based teleportation network is a network where no quantum information is travelling through it; instead, quantum nodes generate and distribute entanglement among themselves through fiber or free space to perform quantum teleportation. However, quantum communication over optical fiber links still presents limitations in terms of reachable distance.

DESCRIPTION OF EXAMPLE EMBODIMENTS

Overview

Figure 1:
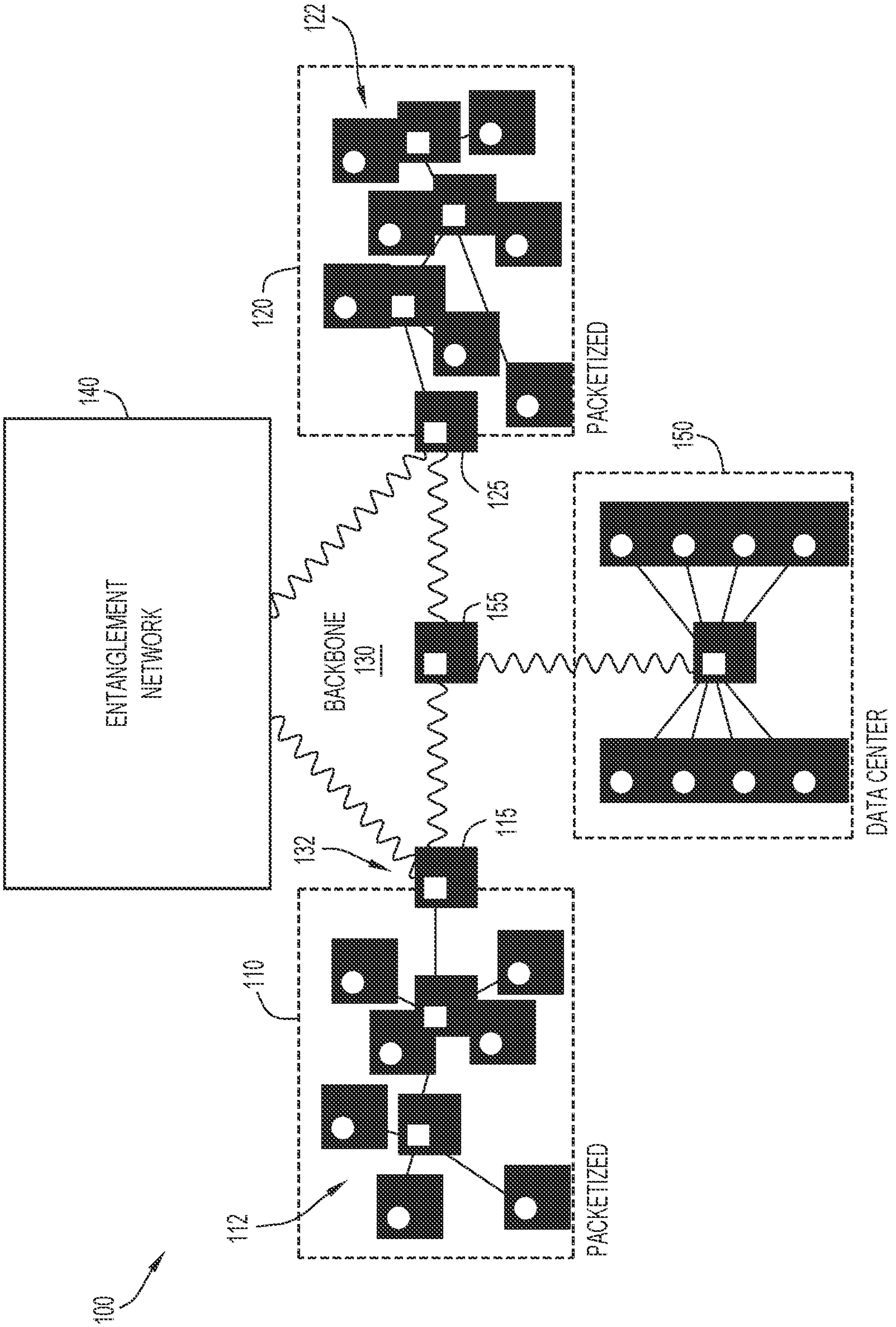
FIG. 1 is a block diagram of an example communication environment in which a quantum backbone network may be implemented, according to an example embodiment.

An embodiment uses entanglement and quantum teleportation to build a quantum backbone network. A network interface interconnects packetized quantum networks with entanglement-based quantum backbone networks.

Example Embodiments

An embodiment uses entanglement and quantum teleportation to build a quantum backbone network. A network interface interconnects packetized quantum networks with entanglement-based quantum backbone networks.

Since single-photon transmission over fiber suffers from high loss, which increases exponentially with distance, a viable approach to address this impairment is the introduction of quantum repeaters. These repeaters are responsible for creating entanglement links between adjacent nodes and performing entanglement swapping to establish end-to-end entanglement.

Further, free space communication and satellite communication have emerged as a complementary approach to address this issue. The performance has been investigated in terms of quantum key distribution rates considering a satellite as a backbone network and with respect to an entanglement end-to-end rate of a constellation composed of more than one satellite. However, these rely on a pre-computed path between remote end users and follow a circuit switching approach.

In general, a backbone network is a network used for interconnecting subnetworks. It is usually responsible for long haul network traffic and has high-capacity channels to transmit with high transmission rates. Backbone networks generally use different routing schemes and protocols than the subnetworks to maximize throughput between destination subnetworks. The subnetworks are associated with ingress and egress nodes responsible for interfacing with the backbone network.

Packet-switched quantum networks may use hybrid classical-quantum data frames with direct transmission of quantum states. The hybrid frames pre-pend and post-pend a quantum payload with classical routing and error correction information. This information is used to dynamically switch the quantum payload through the network. In contrast, an entanglement-based quantum network relies on stored entanglement, consumed to perform quantum teleportation, to transmit quantum information.

At a metropolitan scale, use of packet-switched quantum networks removes the need for entanglement distribution and robust quantum memories, that is, it removes the need for using teleportation. However, packet-switched quantum networks, without some form of quantum repeater, have distance limitations where, after roughly 100 km of standard fiber, the rate of quantum transmission approaches zero. On the other hand, entanglement-based networks resolve the distance limitations, but the communication rate is greatly reduced compared to using direct transmission at short distances since the rate is capped at the rate at which entanglement can be generated. Moreover, for multiple hops, a high level of synchronization is used amongst the nodes to perform entanglement swapping. Since a high-level of synchronization is required in an entanglement-based network, the scaling in terms of the number of users the network can support suffers.

A quantum backbone network of a present embodiment seamlessly integrates satellite and direct fiber links, thereby ensuring a continuous and robust entanglement service. The present embodiment provides a quantum backbone network for hybrid quantum data transmission and includes a network interface to merge a packetized quantum network and an entanglement-based backbone network.

FIG. 1 illustrates an example communication environment 100 in which a quantum backbone network may be implemented, according to an example embodiment. Initially, communication environment 100 includes packetized quantum subnetworks 110, 120 and a quantum backbone network 130 including, or coupled to, an entanglement network 140. Subnetwork 110 includes one or more network nodes 112 that may perform various communication and other operations (e.g., routing, receiving, transmitting, etc.), while subnetwork 120 includes one or more network nodes 122 that may similarly perform various communication and other operations (e.g., routing, receiving, transmitting, etc.).

Quantum backbone network 130 is coupled to subnetworks 110, 120 and includes a plurality of nodes 132. One or more nodes 132 may serve as interface nodes for interfacing with subnetworks 110, 120. By way of example, nodes 132 may include an interface node 115 for interfacing subnetwork 110. Interface node 115 may serve as an egress node for subnetwork 110 to interface subnetwork 110 with quantum backbone network 130 to send packets or frames from nodes 112 of subnetwork 110 over the quantum backbone network to an intended destination in another subnetwork (e.g., subnetwork 120, etc.) coupled to the quantum backbone network. Interface node 115 may further serve as an ingress node for subnetwork 110 to interface quantum backbone network 130 with subnetwork 110 to receive packets or frames from the quantum backbone network initially sent from another subnetwork (e.g., subnetwork 120, etc.) coupled to the quantum backbone network.

Further, nodes 132 may include an interface node 125 for interfacing subnetwork 120. Interface node 125 may serve as an egress node for subnetwork 120 to interface subnetwork 120 with quantum backbone network 130 to send packets or frames from nodes 122 of subnetwork 120 over the quantum backbone network to an intended destination in another subnetwork (e.g., subnetwork 110, etc.) coupled to the quantum backbone network. Interface node 125 may further serve as an ingress node for subnetwork 120 to interface quantum backbone network 130 with subnetwork 120 to receive packets or frames from the quantum backbone network initially sent from another subnetwork (e.g., subnetwork 110, etc.) coupled to the quantum backbone network. However, the egress and ingress nodes for quantum backbone network 130 may be implemented by the same or separate nodes 132.

Quantum backbone network 130 has entanglement already established (e.g., via entanglement network 140) such that when quantum information arrives (at a node 132 serving as an egress node), the quantum state can be teleported immediately. The quantum backbone network may use various conventional or other technologies to perform long-haul communication between subnetworks. For example, the quantum backbone network may use fiber optical connections (e.g., a terrestrial network, etc.), satellite links (e.g., using ingress and egress nodes as ground stations forming a non-terrestrial network, etc.), or a combination of thereof for classical and quantum communication. The quantum backbone network generates entanglement at the entry points of the subnetworks (e.g., interface nodes 115, 125) such that when teleportation is needed, it is ready to perform. The quantum backbone network may use any conventional or other techniques for entanglement distribution, swapping, and purification to achieve end-to-end entanglement at the subnetwork entry nodes (e.g., interface nodes 115, 125).

In other words, packetized subnetworks 110, 120 are interconnected via entanglement-based quantum backbone network 130. Quantum data from a packetized subnetwork is sent to an egress node and teleported to an ingress node for another packetized subnetwork. The teleportation channel (of the quantum backbone network) may be composed of fiber technology or satellite, and may incorporate other quantum network types, such as a quantum datacenter 150.

Quantum backbone network 130 is not limited to connecting packetized subnetworks but may connect with any type of quantum subnetwork (e.g., a quantum datacenter 150 (associated with an interface node 155), a directly connected quantum computer, an entanglement-based network, coherent-state qubit transport optical network, or any other kind of network, etc.). To integrate another network type, the network interface of an associated interface node is configured to function according to the subnetwork and protocols defined for de-constructing and reconstructing data frames at the egress and ingress of another subnetwork in substantially the same manner described below. This enables heterogeneous networks, where subnetworks with different types of quantum networks can communicate using their own routing protocols locally and using the quantum backbone network to communicate with other subnetworks.

Entanglement network 140 entangles resources for communication (or teleportation) by quantum backbone network 130. By way of example, entanglement network 140 may include any conventional or other satellite network (e.g., low earth orbit (LEO), etc.). In an embodiment, a low earth orbit (LEO) satellite system may be employed. In this case, the entanglement is implemented with a source onboard the satellite, and the resulting entangled photons are sent over Free-space Optical Links (FSOL) using telescopes and high-precision alignment technology with closed loop motion control utilizing an accelerometer for stabilizing alignment. Since the distance between the satellite and receiving station changes rapidly and in a smooth motion (due to movement in a satellite orbit), the changing distances are taken into account in the process of photon exchange. For example, some delay is added to one of the photons since receiving stations on the ground are not equidistant from the satellite. Entangled photons arrive at the interface nodes for their destination network to be consumed for teleportation purposes. The system employs highly accurate time synchronization (e.g., nanosecond, picosecond, etc.) between the nodes so that a sibling photon sent from the satellite system is consumed for the remote side of the teleportation process. This ensures the nodes receive and implement the teleportation action on the right photon because of the time of arrival.

In an embodiment, when a remote egress ground station is significantly far away, a constellation resource manager of the satellite system leverages Inter-Satellite Links (ISL) to create a path between egress nodes, even when the remote node is way over the horizon and out of sight. With the transmission of photons through a low earth orbit (LEO) satellite constellation, to replicate the behavior of source-based routing, an approach may use a classical header to instruct the next-hop satellite to switch the following photon to the next identified satellite, all the way along the path until the header is complete. The final label is removed which instructs the final satellite to forward to the ground-station user egress node.

In an embodiment, another approach may be employed. At each hop, the label in the header for that hop is dropped, and a precise quantum swap operation (e.g., swap quantum states) is performed with the received photon and a photon in an entangled pair resource with the next satellite in the path. Thus, neighboring satellites are constantly exchanging entangled pairs. As the network is traversed hop by hop, this becomes a chain of quantum swap operations. A final swap operation to the destination allows the teleportation to occur for the operation required by the users of the satellite network.

In an embodiment, continually entangling satellites in the same plane and which cross paths for a short period of time (crossing in the sky) may be used. In this case, a satellite may be used as a source/path, such that entanglement is exchanged, utilized, and discarded once a trigger of distance/hops is reached. A protocol for entanglement consumption may be guided by user equipment providing a request to set-up a new path. The entanglement-mesh in space is always generating pairs into memories, such that a new path can consume the path required when requested (e.g., requests flow through the network and the path/chain of swaps is stood up). This may be implemented from a software-defined network (SDN) or resource manager application on the ground, similar to classical networking.

An embodiment may provide one or more of the approaches described above to support a broader set of users and use cases since each satellite has an entangled photon source onboard. Entanglement network 140 establishes entangled pairs (or qubits) that are stored at corresponding (or the same) storage location in quantum memories of egress and ingress nodes. The storage locations for entangled qubits are maintained in an index that is synchronized between the egress and ingress nodes (each having a qubit of the entangled pair). The index may indicate storage locations of available qubits for teleportation, track the storage locations (or qubits) used for teleportation, and/or associate the storage locations with corresponding interface nodes. In this case, the egress node may teleport quantum information (according to a teleportation protocol) using an entangled qubit of a quantum memory of the egress node (e.g., entangle the quantum information with the entangled qubit, etc.). The ingress node may receive and use classical teleportation information to reconstruct the quantum information from the entangled qubit stored at the corresponding storage location in the quantum memory of the ingress node.

To support communication schemes between quantum subnetworks 110, 120 through quantum backbone network 130, quantum interface (ingress and egress) nodes 115, 125 are used. The interface nodes act to facilitate quantum communication based on different protocols.

An example transmission between subnetworks 110, 120 may operate as follows. By way of example, a node 112 of subnetwork 110 may send a frame over quantum backbone network 130 to a node 122 of subnetwork 120. However, nodes of any subnetworks may send frames over quantum backbone networks to nodes of any other subnetworks in substantially the same manner described below. Within subnetworks 110, 120, a dynamic packet-switching or a burst-switching approach may be used. A hybrid classical-quantum frame (with a quantum payload) is sent from a node 112 of subnetwork 110 to interface (or egress) node 115. The frame includes a quantum payload (e.g., data to be sent, etc.) and classical header and trailer information (e.g., routing information, destination information, frame attributes, etc.), and is routed using the classical header information (e.g., routing information, destination information, etc.). Interface (or egress) node 115 acts as an interface to quantum backbone network 130. Interface (or egress) node 115 has entanglement or entangled resources already established with interface (or ingress) node 125 of subnetwork 120 or may establish the entanglement (within a short amount of time). The entanglement is established via entanglement network 140.

Interface (or egress) node 115 strips the hybrid frame of its header and trailer, and the quantum payload is teleported through a channel of quantum backbone network 130 via any conventional or other teleportation protocol. For example, a teleportation protocol may involve a sender and receiver each having a qubit of an entangled pair. A data qubit to be transmitted from the sender to the receiver is entangled with the qubit of the sender, and a measurement is performed producing a classical bit string (or correction bits). The bit string is sent to the receiver using classical communication. The bit string (or correction bits) indicates an operation to perform on the qubit (of the entangled pair) of the receiver to transfer the state of the data qubit to the receiver qubit (effectively teleporting the state of the data qubit to the receiver).

In the example case, the classical teleportation information, along with the header and trailer information, is sent via classical communication using a circuit switching approach to minimize latency. At destination subnetwork 120, interface (or ingress) node 125 receives the classical teleportation information and header and trailer information and uses the teleportation information to reconstruct the qubits (or quantum payload) locally. Interface (or ingress) node 125 reframes the quantum payload into a hybrid frame and transmits the hybrid frame (with header and trailer information and qubits in the payload) using the packet switching approach to its destination (e.g., a node 122 of subnetwork 120).

Figure 2:
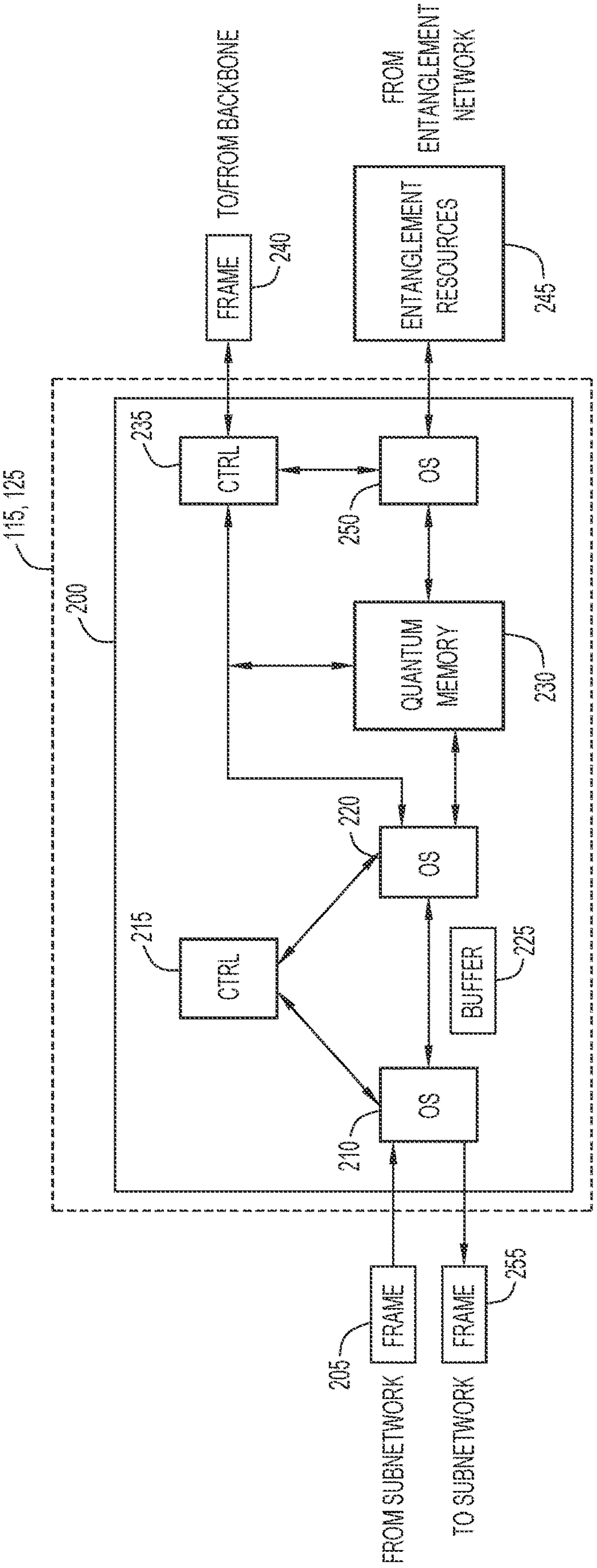
FIG. 2 illustrates a network interface for communication over a quantum backbone network, according to an example embodiment.

With continued reference to FIG. 1, FIG. 2 illustrates a network interface 200 (e.g., of an interface node 115, 125) for communication over quantum backbone network 130, according to an example embodiment. Network interface 200 includes optical switches 210, 220, and 250, a quantum buffer 225, classical controllers 215, 235, and a quantum memory 230. These may be implemented by any conventional or other components to perform functions of a present embodiment. Network interface 200 may serve as an egress and/or ingress interface as described below. The egress and ingress operations may be performed within the same or separate network interfaces. With respect to an egress interface, by way of example, an incoming hybrid classical-quantum frame 205 is received from a subnetwork 110, 120 coupled to quantum backbone network 130. Frame 205 includes classical header and trailer information (e.g., routing information, destination information, frame attributes, etc.) and a quantum payload (e.g., data, etc.).

Optical switch 210 processes hybrid frame 205 to split (or extract) the quantum payload from the header and trailer. Optical switch 210 is coupled to classical controller 215, optical switch 220, and quantum buffer 225. The quantum payload can be stored in quantum buffer 225 until resources are available to proceed. If burst switching is used, the quantum payload could arrive behind the header with enough time such that no storage of the quantum payload is needed. The header and trailer are provided from optical switch 210 to classical controller 215. Classical controller 215 determines a destination for the quantum payload based on the header and/or trailer, renders a routing decision (e.g., determines a routing path, etc.), and produces classical control information (e.g., routing control or other information, etc.). The classical control information is sent onward to classical controller 235 through optical switch 220 coupled to classical controllers 215, 235.

To perform teleportation, the quantum payload from optical switch 210 enters quantum memory 230 via optical switch 220 coupled to the quantum memory and optical switch 210. Optical switch 220 may receive the quantum payload from quantum buffer 225 when the quantum payload is stored in the buffer. The quantum memory produces classical teleportation information (e.g., correction bits, index or storage location information for the quantum memory, etc.) via any conventional or other teleportation protocol to teleport the quantum payload. Classical controller 235 receives the classical header and trailer from optical switch 220 and the teleportation information from quantum memory 230, and sends this information (e.g., in a packet or frame 240) in a circuit switched approach over quantum backbone network 130 to an interface (or ingress) node of an intended subnetwork.

With respect to an ingress interface, incoming entanglement resources 245 from entanglement network 140 of quantum backbone network 130 is received by optical switch 250 of network interface 200 coupled to classical controller 235 and quantum memory 230. Frame 240 may be received from quantum backbone network 130 that includes classical header and trailer information (e.g., routing information, destination information, frame attributes, etc.), and teleportation information (e.g., correction bits, index or storage location information for the quantum memory, etc.). The classical information is passed to classical controller 235. The header and trailer are forwarded to optical switch 220 for hybrid frame reconstruction, while the teleportation information is provided from optical switch 250 to quantum memory 230. The teleportation information is used by quantum memory 230 (according to the teleportation protocol) to reconstruct (teleported) quantum information that is provided to optical switch 220. When that is complete, a frame 255 is produced with the header and trailer preferably framed around the reconstructed quantum information (forming a quantum payload). Frame 255 is sent though optical switch 210 to the corresponding subnetwork.

Figure 3:
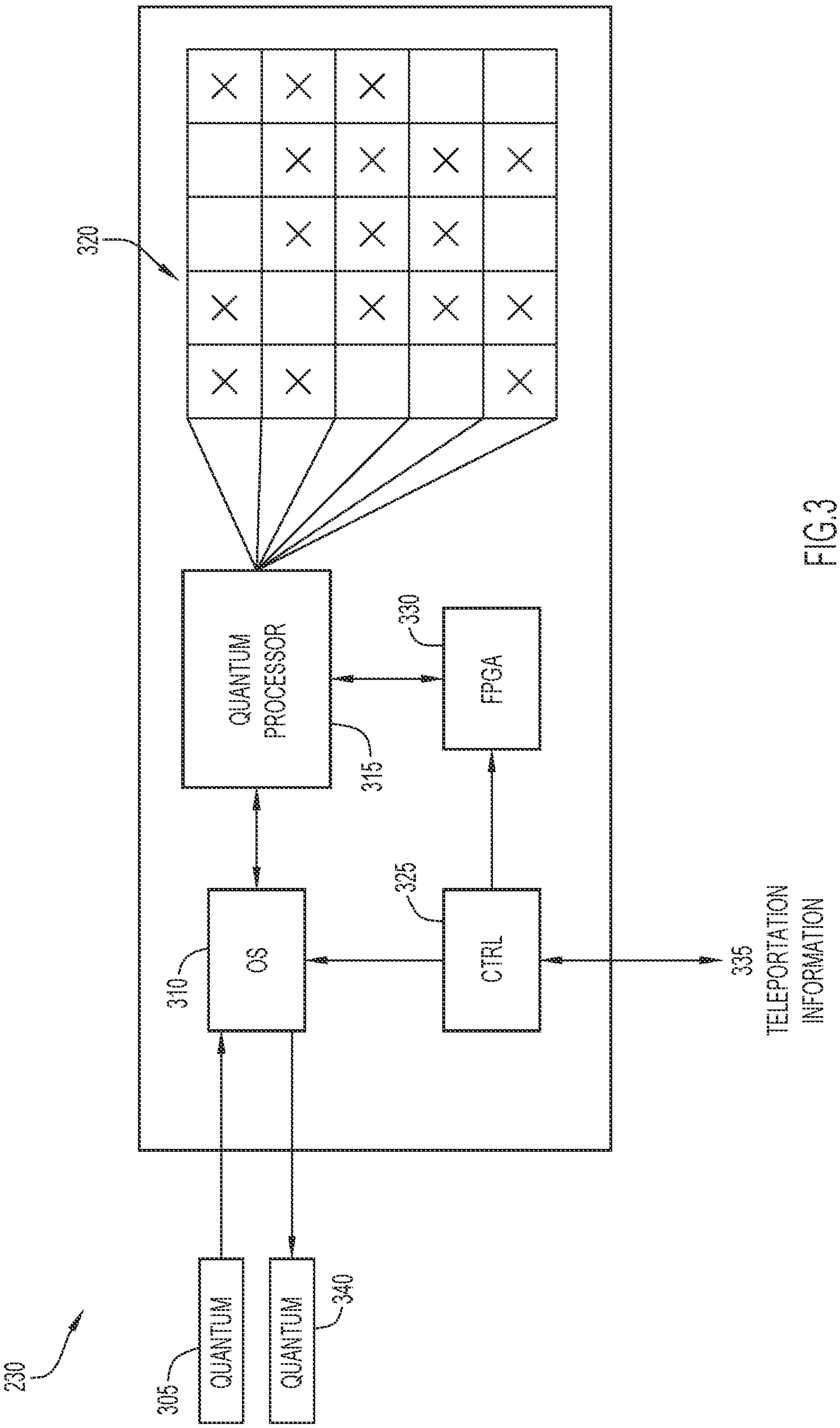
FIG. 3 illustrates a quantum memory for use with the network interface of FIG. 2, according to an example embodiment.
Figure 4:
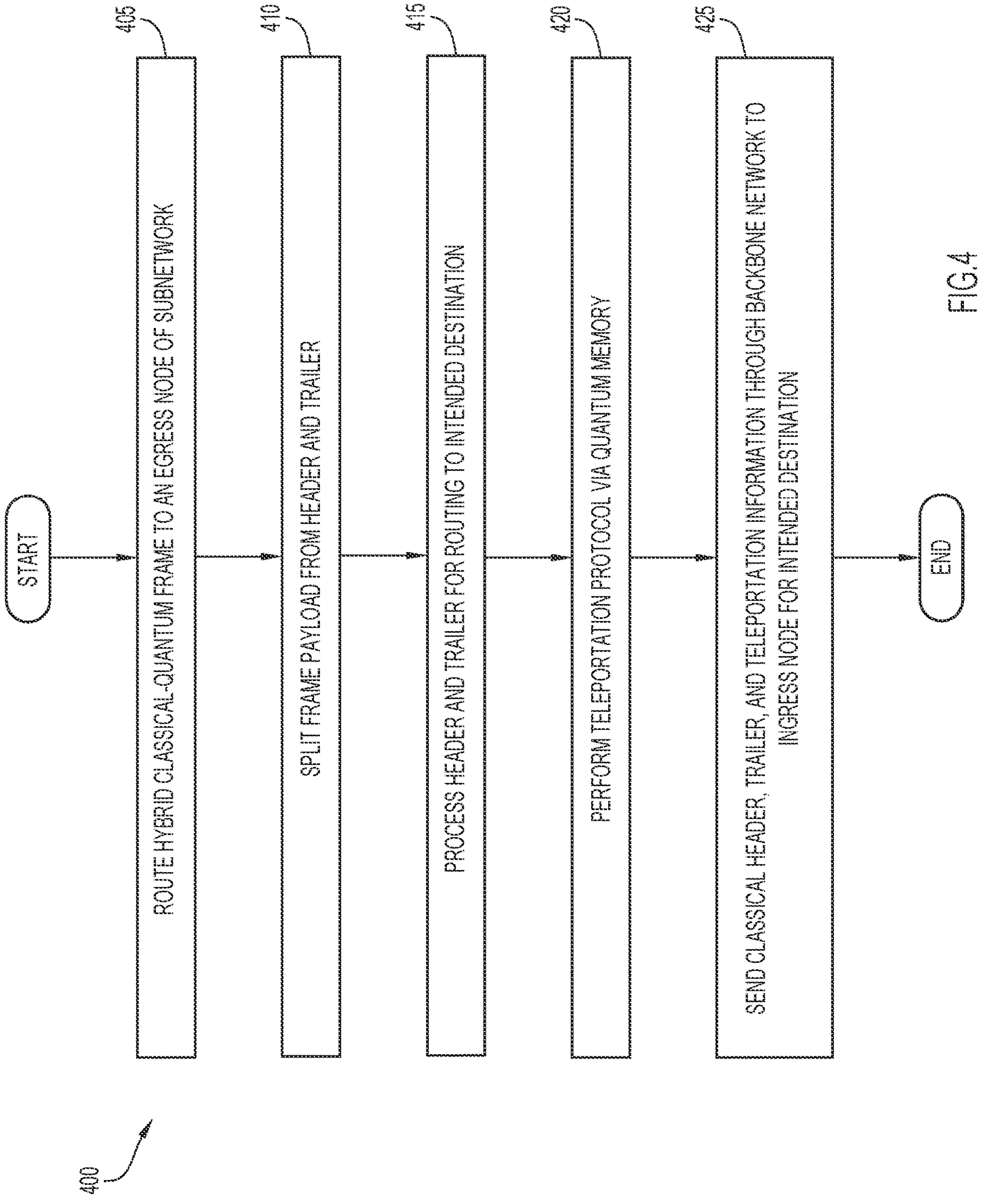
FIG. 4 illustrates a flowchart of a method for sending a frame over a quantum backbone network, according to an example embodiment.
Figure 5:
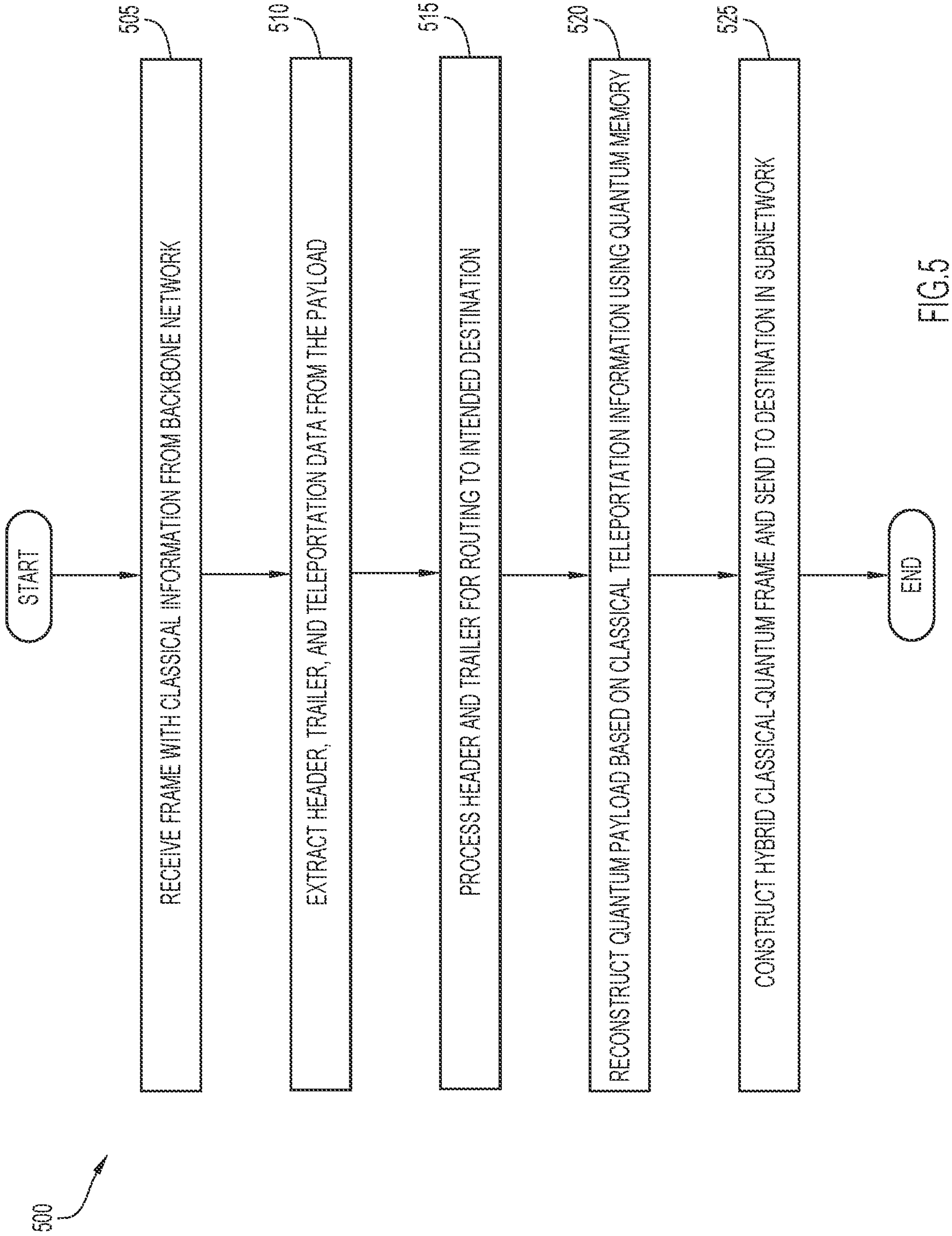
FIG. 5 illustrates a flowchart of a method for receiving a frame from a quantum backbone network, according to an example embodiment.

With continued reference to FIGS. 1-2, FIG. 3 illustrates a quantum memory 230 for use with network interface 200, according to an example embodiment. Quantum memory 230 includes an optical switch 310, a quantum processor 315 including, or coupled to, a quantum storage unit 320, a field programmable gate array (FPGA) 330, and a classical controller 325. These may be implemented by any conventional or other components to perform functions of a present embodiment. Quantum memory 230 is used for teleporting quantum information according to a teleportation protocol in an egress interface and for reconstructing the (teleported) quantum information according to the teleportation protocol in an ingress interface.

With respect to an egress interface, a quantum payload 305 from a hybrid classical-quantum frame is provided to quantum memory 230 for teleportation in substantially the same manner described above. The quantum payload is provided to quantum processor 315 via optical switch 310 coupled to the quantum processor and classical controller 325. The classical controller controls optical switch 310 and FPGA 330 to perform operations of the egress and ingress interfaces. The quantum processor performs teleportation of the quantum payload according to any conventional or other teleportation protocol. The teleportation protocol requires that there be shared entanglement resources in quantum storage unit 320 (included in, or coupled to, quantum processor 315) already available at the start of the protocol. The quantum storage unit contains qubits of which some qubits may be lost in transmission (e.g., ‘x’ indicates qubits present in quantum storage unit 320 as viewed in FIG. 3). The qubits in quantum storage unit 320 are entangled with qubits at corresponding storage locations in a quantum storage unit of the ingress node of the subnetwork 120. This enables the ingress to access the appropriate qubit from the ingress quantum storage unit for reconstructing the (teleported) quantum information.

Storage unit 320 is indexed since entanglement resources carry no identifying information (e.g., the index indicates storage locations of entangled qubits with the receiver). The storage unit index may indicate storage locations of available qubits for teleportation, track the storage locations (or qubits) used for teleportation, and/or associate the storage locations with corresponding remote interface nodes for which the storage unit has a stored entanglement. Moreover, the storage unit index is synchronized with a second storage unit index at the ingress, so that when classical teleportation information arrives at the ingress, it is known which index (or storage location) in the ingress quantum storage unit to apply correction bits from the teleportation information. In other words, the storage unit index indicates the storage location of the qubit entangled with the qubit in the quantum storage unit of the ingress. This information enables the ingress to access the appropriate qubit from the ingress quantum storage unit to reconstruct the (teleported) quantum information. Various conventional or other queuing practices can be used to perform this synchronization.

When the teleportation protocol is performed, quantum processor 315 accesses the index to determine (a storage location) of an available qubit and entangles quantum payload 305 with the available qubit that produces teleportation information 335 including classical bits of information (or correction bits). This may be performed for one or more qubits sufficient for teleportation of the quantum payload. The qubits of the quantum payload and entanglement resources are consumed, thereby freeing up space in quantum storage unit 320. The teleportation information from the teleportation protocol is provided from quantum memory 230 via FPGA 330 including the classical bits of information and information regarding the storage unit indexes (e.g., the storage locations of the entangled qubits, where the corresponding entangled qubits are stored at the same or corresponding storage locations in the receiver quantum storage unit).

With respect to an ingress interface, classical teleportation information 335 can enter quantum memory 230 to reconstruct a quantum payload 340. The teleportation information includes the classical teleportation information that is output from the quantum memory as described above. The index information from the teleportation information is applied to the synchronized index to determine the corresponding one or more storage locations containing the entangled qubits and the correction bits from the teleportation information are applied to the corresponding qubits of quantum storage unit 320 using quantum processor 315 via FPGA 330 under control of classical controller 325 to reconstruct the (teleported) quantum information. Once applied, the one or more reconstructed qubits are released from storage unit 320 and sent out (as quantum payload 340) through optical switch 310 under control of classical controller 325.

In addition to these processes, quantum memories 230 of interface nodes always try to generate more entangled qubits amongst themselves within the teleportation channel of quantum backbone network 130 to fill their memories as much as possible. Thus, entanglement units (along with some classical information) may enter quantum memory 230 for storage. Any conventional or other protocol for entanglement distribution may be used to synchronize the nodes and build up entanglement resources, along with flow control protocol and triggers, for example to request a back-off at the sender if required when the memory or permitted entanglement generation rate is saturated.

With continued reference to FIGS. 1-3, FIG. 4 illustrates a flowchart of a method 400 for sending a frame over a quantum backbone network, according to an example embodiment. By way of example, a node 112 of subnetwork 110 may send a frame over quantum backbone network 130 to a node 122 of subnetwork 120. However, nodes of any subnetworks may send frames over quantum backbone networks to nodes of any other subnetworks in substantially the same manner described below.

Initially, entanglement is established between quantum memories 230 of interface (egress) node 115 and interface (ingress) node 125 via entanglement network 140 in substantially the same manner described above. Quantum information of entangled qubits are stored in corresponding (or the same) memory locations of the different quantum memories for teleportation. A hybrid classical-quantum frame is sent from a node 112 of subnetwork 110 to interface (or egress) node 115 at operation 405. The hybrid frame includes a quantum payload (e.g., data, etc.) and classical header and trailer information (e.g., routing information, destination information, frame attributes, etc.), and is routed using classical header information (e.g., packet-switching, etc.). Interface (or egress) node 115 acts as an interface for quantum backbone network 130. Interface (egress) node 115 has entanglement resources already established with interface (ingress) node 125 for subnetwork 120 or may establish the entanglement (within a short amount of time) via entanglement network 140.

Interface (or egress) node 115 strips (or extracts) the header and trailer from the hybrid frame at operation 410 in substantially the same manner described above. Interface (or egress) node 115 determines a destination for the quantum payload based on the header and/or trailer, renders a routing decision (e.g., determines a routing path, etc.), and produces classical control information (e.g., routing control or other information, etc.) for routing to an intended destination at operation 415 in substantially the same manner described above.

The quantum payload is provided to quantum memory 230 of interface (or egress) node 115 that teleports the quantum payload through the teleportation channel of quantum backbone network 130 via any conventional or other teleportation protocol at operation 420 in substantially the same manner described above. For example, the quantum memory produces classical teleportation information according to the teleportation protocol (e.g., correction bits, index or storage location information for the quantum memory, etc.) to enable reconstruction of the quantum payload at interface (ingress) node 125 in substantially the same manner described above. Interface (egress) node 115 sends the classical teleportation information and the header and trailer information over quantum backbone network 130 at operation 425 via classical communication in substantially the same manner described above.

With continued reference to FIGS. 1-4, FIG. 5 illustrates a flowchart of a method 500 for receiving a frame from a quantum backbone network, according to an example embodiment. By way of example, a node 112 of subnetwork 110 may send a frame over quantum backbone network 130 to a node 122 of subnetwork 120. However, nodes of any subnetworks may send frames over quantum backbone networks to nodes of any other subnetworks in substantially the same manner described below.

Initially, entanglement is established between quantum memories 230 of interface (egress) node 115 and interface (ingress) node 125 via entanglement network 140 in substantially the same manner described above. Quantum information of entangled qubits is stored in corresponding (or the same) memory locations of the different quantum memories for teleportation. Interface (or ingress) node 125 receives classical teleportation information (e.g., correction bits, index or storage location information for the quantum memory, etc.) and header and trailer information from quantum backbone network 130 (initially sent by a node 112 of subnetwork 110 via interface (egress) node 115) at operation 505 in substantially the same manner described above.

Interface (or ingress) node 125 strips (or extracts) the header and trailer and teleportation data or information from the hybrid frame at operation 510 in substantially the same manner described above. Interface (or ingress) node 125 determines a destination for the quantum payload based on the header and/or trailer, renders a routing decision (e.g., determines a routing path, etc.), and produces classical control information (e.g., routing control or other information, etc.) for routing to an intended destination at operation 515 in substantially the same manner described above.

Interface (ingress) node 125 provides the teleportation information to quantum memory 230 that uses the teleportation information at operation 520 to reconstruct the qubits (or quantum payload) locally (according to the teleportation protocol) in substantially the same manner described above. Interface (ingress) node 125 re-frames the quantum payload into a hybrid frame (e.g., with the quantum payload surrounded by a header and trailer) and transmits the hybrid frame (with header and trailer information and qubits in the payload) using the packet switching approach to its destination (e.g., a node 122 of subnetwork 120) at operation 525 in substantially the same manner described above.

Figure 6:
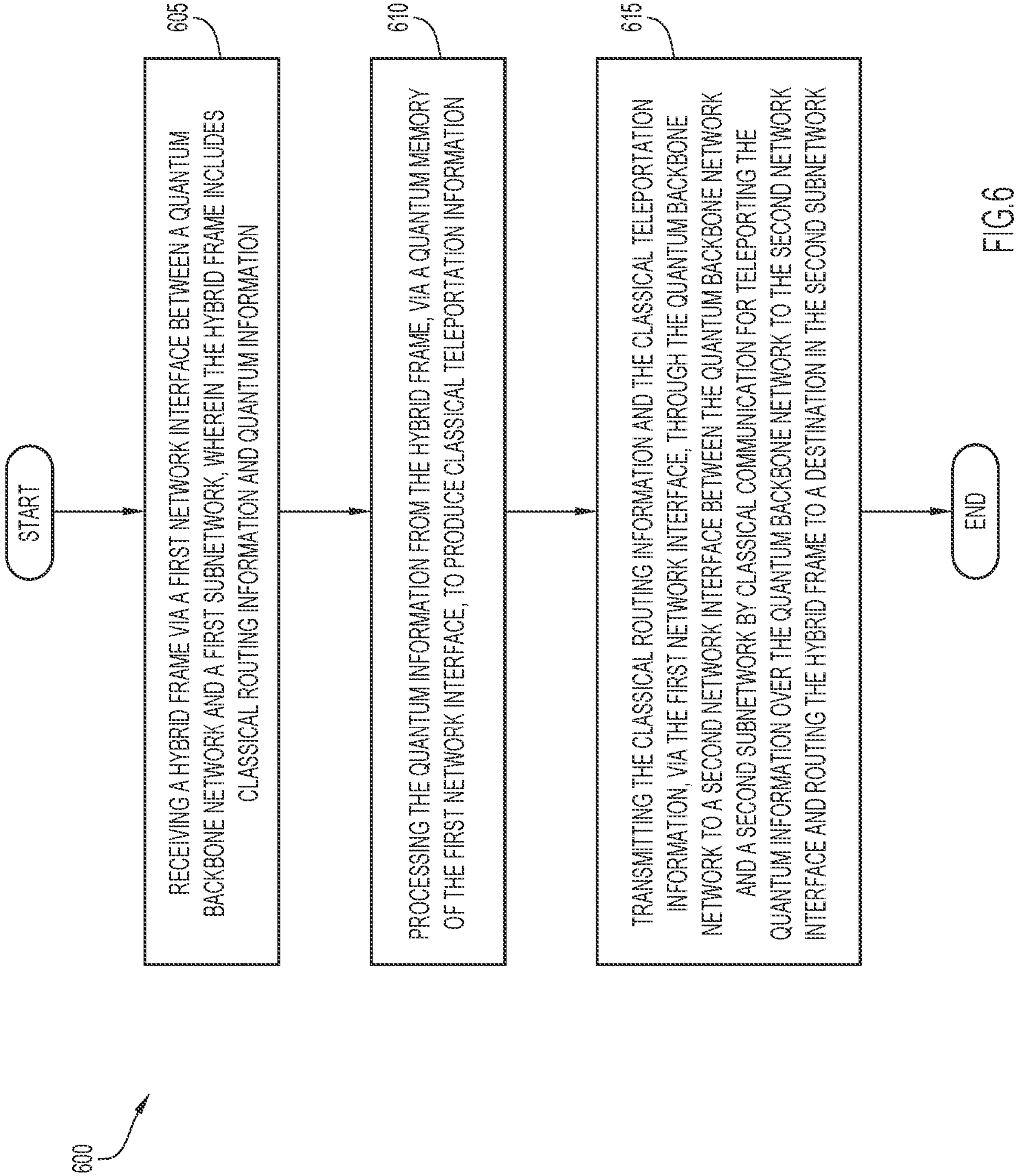
FIG. 6 illustrates a flowchart of a generalized method for communicating over a quantum backbone network, according to an example embodiment.

FIG. 6 illustrates a flowchart of an example method 600 for communicating over a quantum backbone network, according to an example embodiment. At operation 605, a hybrid frame is received via a first network interface between a quantum backbone network and a first subnetwork. The hybrid frame includes classical routing information and quantum information. At operation 610, a quantum memory of the first network interface processes the quantum information from the hybrid frame to produce classical teleportation information. At operation 615, the first network interface transmits the classical routing information and the classical teleportation information through the quantum backbone network to a second network interface between the quantum backbone network and a second subnetwork by classical communication for teleporting the quantum information over the quantum backbone network to the second network interface and routing the hybrid frame to a destination in the second subnetwork.

Figure 7:
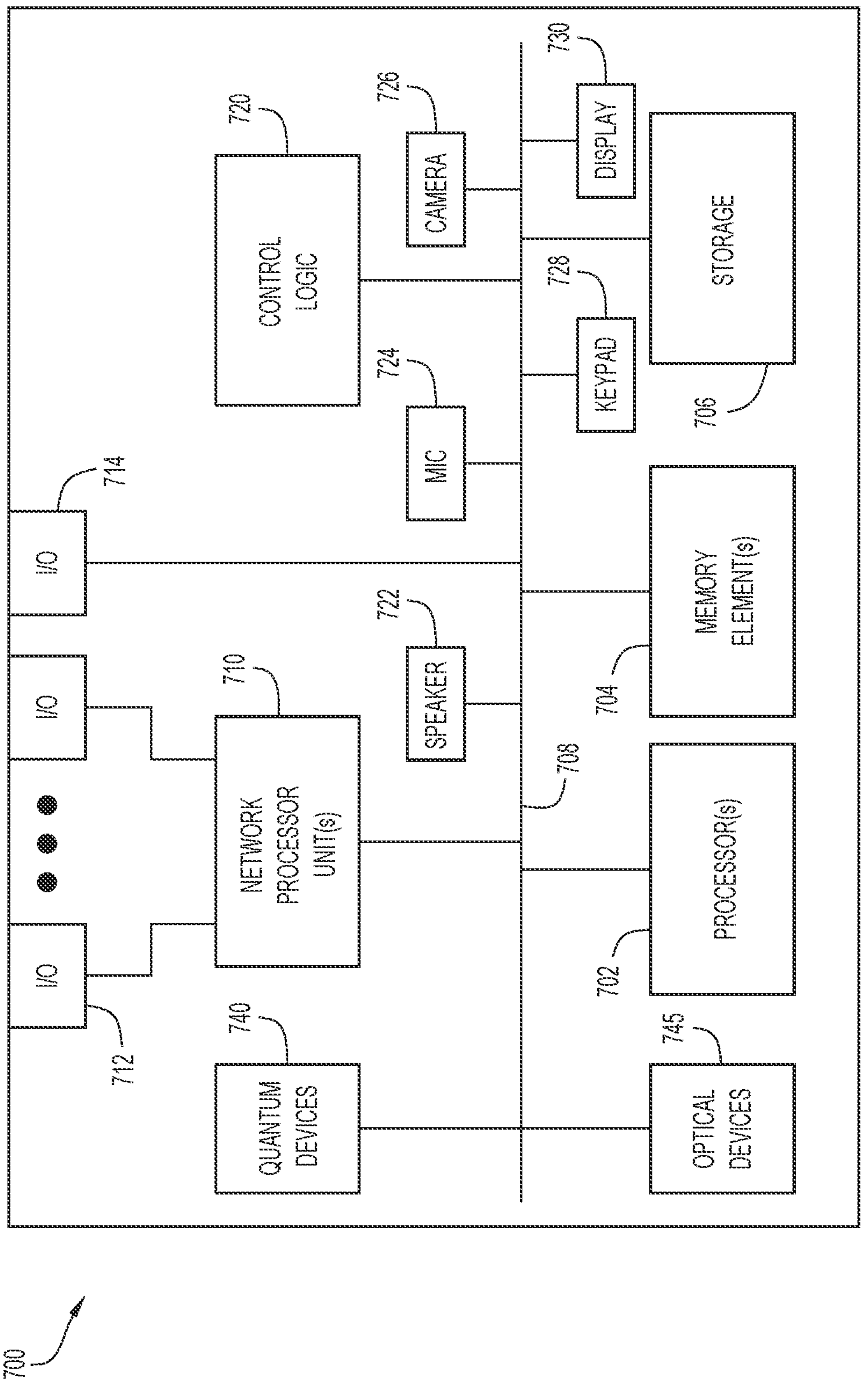
FIG. 7 illustrates a hardware block diagram of a computing device configured to perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus or system, such as computing device 700 or any combination of computing devices 700, may be configured as any device entity/entities (e.g., nodes, computer devices, user devices, client devices, communication devices, network devices, controllers, etc.) as discussed for the techniques depicted in connection with FIGS. 1-6 in order to perform operations of the various techniques discussed herein.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., driver(s) optical) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., client device, network device, nodes, etc.), computing device 700 may further include, or be coupled to, a speaker 722 to convey sound, microphone or other sound sensing device 724, camera or image capture device 726, a keypad or keyboard 728 to enter information (e.g., alphanumeric information, etc.), a touch screen or other display 730, quantum devices 740, and/or optical devices 745. These items may be coupled to bus 708 or I/O interface(s) 714 to transfer data with other elements of computing device 700. Quantum devices 740 may include any conventional or other devices to perform the functions described herein (e.g., generating, transmitting, receiving, entangling, and/or processing quantum signals), such as a quantum source, quantum transmitters and receivers, quantum channels, a source of randomness, lasers or other energy sources, quantum measuring devices, quantum logic or other gates or circuits, quantum memories, quantum processors, quantum buffers, etc. Optical devices 745 may include any conventional or other optical devices to perform the functions described herein (e.g., generating, transmitting, receiving, and/or processing optical signals), such as optical switches, optical transmitters and receivers, etc.

In various embodiments, control logic 720 can include instructions that, when executed, cause processor(s) 702 to perform operations, which can include, but not be limited to, providing overall control operations of computing device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices, storage devices, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various network devices, storage devices, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' or 'frame' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: receiving a hybrid frame via a first network interface between a quantum backbone network and a first subnetwork, wherein the hybrid frame includes classical routing information and quantum information; processing the quantum information from the hybrid frame, via a quantum memory of the first network interface, to produce classical teleportation information; and transmitting the classical routing information and the classical teleportation information, via the first network interface, through the quantum backbone network to a second network interface between the quantum backbone network and a second subnetwork by classical communication for teleporting the quantum information over the quantum backbone network to the second network interface and routing the hybrid frame to a destination in the second subnetwork.

In one example, the quantum backbone network includes an entanglement-based network, and the first subnetwork and the second subnetwork include one or more from a group of a packetized network, a quantum subnetwork, a quantum datacenter, a directly connected quantum computer, an entanglement-based network, and a coherent-state qubit transport optical network.

In one example, the method further comprises: reconstructing, via a quantum memory of the second network interface, the quantum information of the hybrid frame based on the classical teleportation information; generating the hybrid frame at the second network interface based on the reconstructed quantum information and the classical routing information; and routing the hybrid frame from the second network interface to the destination in the second subnetwork.

In one example, the method further comprises entangling resources between the first network interface and the second network interface via an entanglement network, wherein qubits of an entangled qubit pair are stored in corresponding storage locations of the quantum memory of the first network interface and the quantum memory of the second network interface.

In one example, the entanglement network includes a satellite network.

In one example, processing the quantum information comprises entangling the quantum information with a qubit of the quantum memory of the first network interface.

In one example, the method further comprises indexing the quantum memory of the first network interface and the quantum memory of the second network interface to indicate storage locations of qubits used for teleportation of the quantum information.

In one example, the method further comprises synchronizing indexes of the quantum memory of the first network interface and the quantum memory of the second network interface to apply the classical teleportation information to corresponding qubits to reconstruct the quantum information.

In another form, an apparatus is provided. The apparatus comprises a first network interface between a quantum backbone network and a first subnetwork, the first network interface coupled to a quantum memory and one or more processors. The one or more processors are configured to: receive a hybrid frame including classical routing information and quantum information; process the quantum information from the hybrid frame, via the quantum memory, to produce classical teleportation information; and transmit the classical routing information and the classical teleportation information through the quantum backbone network to a second network interface between the quantum backbone network and a second subnetwork by classical communication for teleporting the quantum information over the quantum backbone network to the second network interface and routing the hybrid frame to a destination in the second subnetwork.

In another form, an apparatus is provided. The apparatus comprises a first network interface between a quantum backbone network and a first subnetwork, the first network interface coupled to a quantum memory and one or more processors. The one or more processors are configured to: receive classical routing information and classical teleportation information over the quantum backbone network from a second network interface between the quantum backbone network and a second subnetwork, wherein the classical routing information and classical teleportation information are for a hybrid frame of the second network interface including classical information for routing and quantum information; reconstruct, via the quantum memory, the quantum information of the hybrid frame based on the classical teleportation information; generate the hybrid frame based on the reconstructed quantum information and the classical routing information; and route the hybrid frame to a destination in the first subnetwork based on the classical routing information.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

receiving a hybrid frame via a first network interface between a quantum backbone network and a first subnetwork, wherein the hybrid frame includes classical routing information and quantum information;

processing the quantum information from the hybrid frame, via a quantum memory of the first network interface, to produce classical teleportation information; and transmitting the classical routing information and the classical teleportation information, via the first network interface, through the quantum backbone network to a second network interface between the quantum backbone network and a second subnetwork by classical communication for teleporting the quantum information over the quantum backbone network to the second network interface and routing the hybrid frame to a destination in the second subnetwork.

2. The method of claim 1, wherein the quantum backbone network includes an entanglement-based network, and the first subnetwork and the second subnetwork include one or more from a group of a packetized network, a quantum subnetwork, a quantum datacenter, a directly connected quantum computer, an entanglement-based network, and a coherent-state qubit transport optical network.

3. The method of claim 1, further comprising:

reconstructing, via a quantum memory of the second network interface, the quantum information of the hybrid frame based on the classical teleportation information;

generating the hybrid frame at the second network interface based on the reconstructed quantum information and the classical routing information; and routing the hybrid frame from the second network interface to the destination in the second subnetwork.

4. The method of claim 3, further comprising:

entangling resources between the first network interface and the second network interface via an entanglement network, wherein qubits of an entangled qubit pair are stored in corresponding storage locations of the quantum memory of the first network interface and the quantum memory of the second network interface.

5. The method of claim 4, wherein the entanglement network includes a satellite network.

6. The method of claim 4, wherein processing the quantum information comprises:

entangling the quantum information with a qubit of the quantum memory of the first network interface.

7. The method of claim 4, further comprising:

indexing the quantum memory of the first network interface and the quantum memory of the second network interface to indicate storage locations of qubits used for teleportation of the quantum information.

8. The method of claim 7, further comprising:

synchronizing indexes of the quantum memory of the first network interface and the quantum memory of the second network interface to apply the classical teleportation information to corresponding qubits to reconstruct the quantum information.

9. An apparatus comprising:

a first network interface between a quantum backbone network and a first subnetwork, the first network interface coupled to a quantum memory and one or more processors, wherein the one or more processors are configured to:

receive a hybrid frame including classical routing information and quantum information;

process the quantum information from the hybrid frame, via the quantum memory, to produce classical teleportation information; and transmit the classical routing information and the classical teleportation information through the quantum backbone network to a second network interface between the quantum backbone network and a second subnetwork by classical communication for teleporting the quantum information over the quantum backbone network to the second network interface and routing the hybrid frame to a destination in the second subnetwork.

10. The apparatus of claim 9, wherein the quantum backbone network includes an entanglement-based network, and the first subnetwork includes one or more from a group of a packetized network, a quantum subnetwork, a quantum datacenter, a directly connected quantum computer, an entanglement-based network, and a coherent-state qubit transport optical network.

11. The apparatus of claim 9, wherein the one or more processors are further configured to:

store entangled resources between the first network interface and the second network interface from an entanglement network in the quantum memory, wherein qubits of an entangled qubit pair are stored in corresponding storage locations of the quantum memory of the first network interface and a quantum memory of the second network interface.

12. The apparatus of claim 11, wherein the entanglement network includes a satellite network.

13. The apparatus of claim 11, wherein processing the quantum information comprises:

entangling the quantum information with a qubit of the quantum memory of the first network interface.

14. The apparatus of claim 11, wherein the one or more processors are further configured to:

index the quantum memory of the first network interface to indicate storage locations of qubits used for teleportation of the quantum information; and synchronize an index of the quantum memory of the first network interface with an index of the quantum memory of the second network interface to enable the classical teleportation information to be applied to corresponding qubits to teleport the quantum information.

15. An apparatus comprising:

a first network interface between a quantum backbone network and a first subnetwork, the first network interface coupled to a quantum memory and one or more processors, wherein the one or more processors are configured to:

receive classical routing information and classical teleportation information over the quantum backbone network from a second network interface between the quantum backbone network and a second subnetwork, wherein the classical routing information and classical teleportation information are for a hybrid frame of the second network interface including classical information for routing and quantum information;

reconstruct, via the quantum memory, the quantum information of the hybrid frame based on the classical teleportation information;

generate the hybrid frame based on the reconstructed quantum information and the classical routing information; and route the hybrid frame to a destination in the first subnetwork based on the classical routing information.

16. The apparatus of claim 15, wherein the quantum backbone network includes an entanglement-based network, and the first subnetwork includes one or more from a group of a packetized network, a quantum subnetwork, a quantum datacenter, a directly connected quantum computer, an entanglement-based network, and a coherent-state qubit transport optical network.

17. The apparatus of claim 15, wherein the one or more processors are further configured to:

store entangled resources between the first network interface and the second network interface from an entanglement network in the quantum memory, wherein qubits of an entangled qubit pair are stored in corresponding storage locations of the quantum memory of the first network interface and a quantum memory of the second network interface.

18. The apparatus of claim 17, wherein the entanglement network includes a satellite network.

19. The apparatus of claim 17, wherein the classical teleportation information is produced from entangling the quantum information with a qubit of the quantum memory of the second network interface.

20. The apparatus of claim 17, wherein the one or more processors are further configured to:

index the quantum memory of the first network interface to indicate storage locations of qubits used for teleportation of the quantum information; and synchronize an index of the quantum memory of the first network interface with an index of the quantum memory of the second network interface to apply the classical teleportation information to corresponding qubits to reconstruct the quantum information.

* * * * *